Feb. 19, 1957    A. I. APPLETON    2,782,060
SEPARABLE CONDUIT FITTING
Filed May 1, 1952
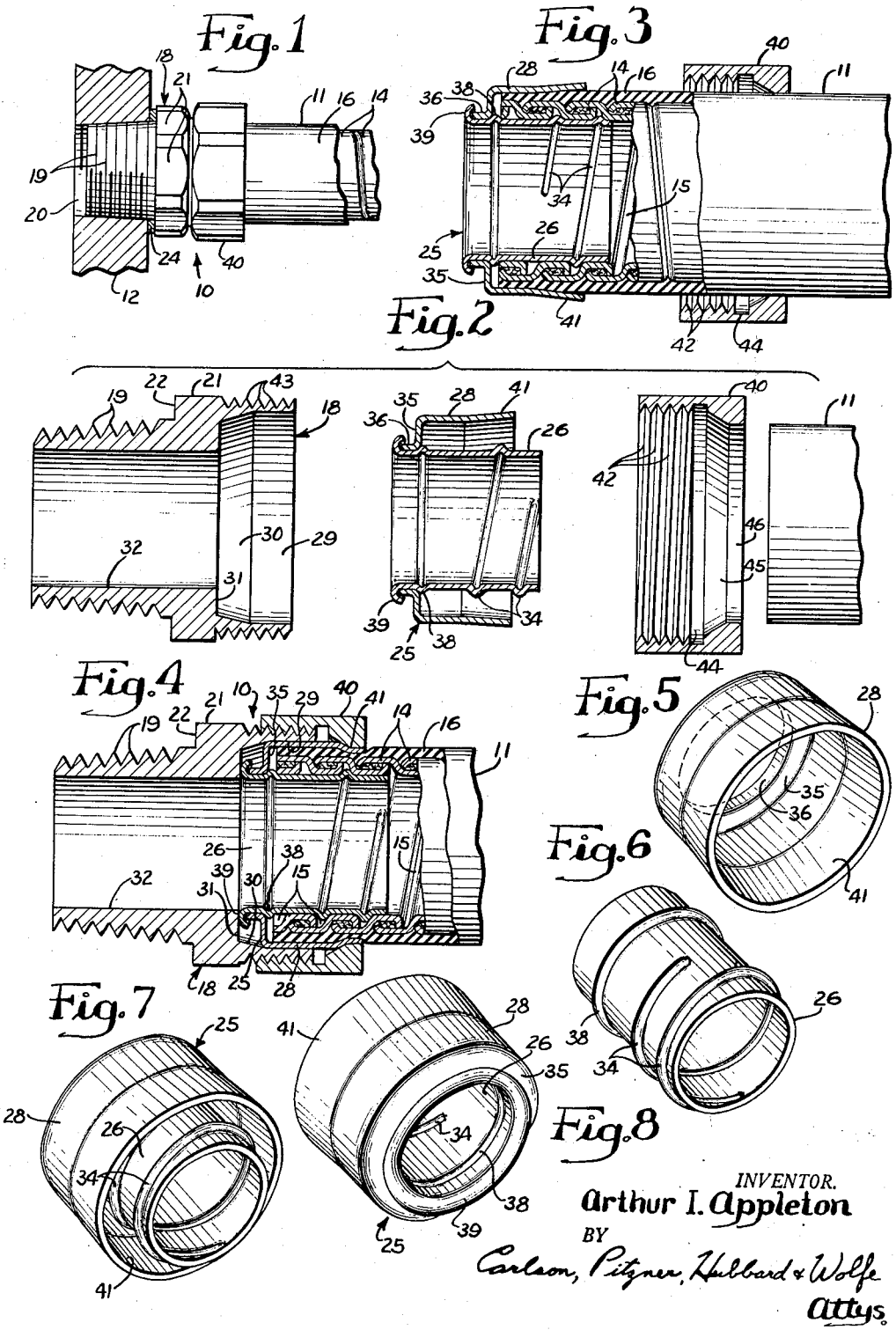
INVENTOR.
Arthur I. Appleton
BY
Carlson, Pitzner, Hubbard & Wolfe
attys.

United States Patent Office 2,782,060
Patented Feb. 19, 1957

2,782,060

SEPARABLE CONDUIT FITTING

Arthur I. Appleton, Northbrook, Ill.

Application May 1, 1952, Serial No. 285,384

4 Claims. (Cl. 285—248)

The present invention pertains in general to conduit fittings and, more specifically, to a novel fitting for use with conduit having an external protective sheath of resilient or yieldable material surrounding an inner metallic core. The invention represents an improvement over the construction disclosed in my copending application Serial No. 264,769, filed January 3, 1952, now abandoned.

One object of the invention is to provide a separable fitting adapted for attachment to the end of a spirally wound, flexible metallic conduit surrounded by a resilient protective sheath of rubber or the like without the need for relative rotation between the conduit and the body of the fitting.

Another object is to provide a fitting of the character set forth and capable of being installed by the simple expedient of tightening a nut, being particularly well adapted to serve as a union for securing the free end of an otherwise anchored conduit to a stationary fixture or to another fitting which cannot be rotated.

A further object is to provide a fitting of the type set forth for attachment to the end of a protectively sheathed spiral metallic conduit without need for stripping the sheath from the end portion of the conduit.

Still another object is to provide a fitting of the foregoing type and which will be of simple, economical construction, comprising parts readily manufactured on a mass productive basis as by screw machine and rolling operations.

Other objects and advantages will become apparent as the following detailed description proceeds, taken in connection with the accompanying drawing, wherein:

Figure 1 is a side elevational view showing one form of illustrative fitting embodying the present invention, such fitting being installed between a flexible conduit and a stationary fixture.

Fig. 2 is an enlarged exploded view of the fitting of Fig. 1 and its associated conduit, showing the parts in longitudinal section prior to installation of the fitting.

Fig. 3 is an enlarged longitudinal sectional view illustrating an intermediate step in the installation of the fitting.

Fig. 4 is an enlarged longitudinal sectional view through the fitting and conduit of Fig. 1.

Fig. 5 is an enlarged perspective view showing one of the internal ferrule elements of the fitting.

Fig. 6 is an enlarged perspective view showing another one of the internal ferrule elements of the fitting.

Figs. 7 and 8 are enlarged perspective views showing opposite ends of the internal ferrule member which comprises the elements shown respectively in Figs. 5 and 6.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawing, the invention is there exemplified in an illustrative fitting 10 which, in the present instance, is utilized for connecting a protectively sheathed flexible conduit 11 and a stationary fixture 12. The flexible conduit 11 has a hard core which happens to be defined by a spirally wound metallic strip having partially overlapping convolutions 14. The latter are arranged in such a manner that a spiral groove 15 is defined along the inner peripheral surface of the conduit 11. A protective sheath 16 of resilient or yieldable material such as synthetic rubber encloses the spiral metallic core of the conduit which may be adapted to house electric wiring or to conduct fluids.

The fitting 10 comprises a hollow body 18 of tubular or sleevelike form and which in this case happens to be provided with tapered external threads 19 for engaging the tapped bore 20 of the stationary fixture 12. Wrench flats 21 or other appropriate tool engaging means may be provided on the exterior of the body 18 for threading the body into the fixture bore 20 or otherwise holding the body during attachment of the conduit thereto. Between the threads 19 and the wrench flats 21, the body 18 may be provided with a radial shoulder 22 adapted to abut against a washer or sealing gasket 24 (Fig. 1) when the fitting 10 is threaded into the fixture 12.

Provision is made for receiving the unstripped end of the conduit 11 within the body 18 and for anchoring the conduit securely therein so that it has exceptionally great resistance to axial pull-out forces. In furtherance of such objective, the fitting 10 has incorporated therein a ferrule assembly or thimble 25 (Figs. 2, 4, 7 and 8) which is adapted for positive attachment to the free end of the conduit 11. The thimble 25 comprises an inner ferrule 26 (Fig. 6) and a surrounding outer ferrule 28 (Fig. 5), both of light tubular stock such as rolled brass. For receiving the thimble 25, the body 18 has a counterbore 29 and an inwardly tapering seat 30, the latter terminating in an abrupt radial shoulder 31 (Fig. 2). The counterbore 29 and tapering seat 30 communicate directly with main bore 32 of the body 18 but are of substantially larger diameter than the bore 32.

The inner ferrule 26 (Figs. 2, 6, 7 and 8) has spiral threads 34 rolled or otherwise formed therein so as to project above its outer peripheral surface. The threads 34 have the same pitch as the groove 15 between the spiral convolutions 14 of the conduit core. Since the inner ferrule 26 is of slightly smaller diameter than the inside diameter of the conduit 11, it will be appreciated that the ferrule 26 can readily be threaded into the end of the conduit.

The outer ferrule 28 (Figs. 2, 5, 7 and 8) is of substantially larger diameter than the ferrule 26 and is disposed in spaced relation with respect to the latter by means of a radial offset 35. The offset 35 supports an integral collar 36 having a diameter just slightly larger than the outer diameter of the ferrule 26 and which telescopically receives one end portion of the latter. The inner ferrule 26 is positioned within the outer ferrule 28 by an annular bead 38 which seats against the radial offset 35. The two ferrule members 26, 28 may be rigidly secured together by the convenient expedient of rolling end portion 39 over and into tight engagement with the collar portion 36 of the ferrule 28 (Figs. 2 and 8), thus drawing the bead 38 snugly against the corner defined between the radial offset 35 and the collar 36.

Referring to Fig. 3, it will be perceived that the thimble 25 may readily be attached to the free end of the conduit 11 by simply inserting the end of the inner ferrule 26 into the end of the conduit 11 and bringing the threads 34 into engagement with the spiral groove 15 between the core convolutions 14. Prior to this step, sealing nut 40, which attaches to the fitting body 18, should first be slipped over the end of the conduit. No special advance preparation of the conduit end need be made, the thimble 25 being susceptible of readily engaging the roughly sawed end of the conduit 11. Attachment of the thimble 25 to the conduit 11 may of course be facilitated by making the inner ferrule 26 somewhat longer than the ferrule 28 so that the conduit engaging end of the ferrule 26 projects substantially beyond the end of the ferrule 28. In addition, the skirt 41 of the ferrule 28 may have a slight outward flare toward its free end. A straight skirt would also be satisfactory, however, provided it were of appropriate diameter to fit over the conduit sheath 16 and also slide into the counterbore 29 of the body.

Turning now to the sealing nut 40 (Figs. 2, 3 and 4), the same is formed with internal threads 42 adapted for engagement with external threads 43 on the body 18 and which surround the counterbore and seat 29, 30. The threads 42 run axially of the nut 40 to an intermediate point which may, for example, be a runout groove 44 for the threading tool. Between the threads 41 and the outer end of the nut 40, the same is formed with a relatively heavy tapered internal shoulder 45 decreasing somewhat abruptly in diameter toward the outer end of the nut, in other words the end of the nut remote from the body, and ending at a bore 46 which makes a comfortable sliding fit with the outer diameter of the conduit sheath 16. The tapered nut shoulder 45 and the thimble skirt 41 are so proportioned that the larger end of the shoulder 45 will just fit over the end of the skirt 41 when these two members are brought together.

In order to attach the fittting 10 to the free end of the conduit 11, the latter may be sawed off to the desired length and the body 18 may be screwed into the stationary fixture 12 or other appropriate connecting means. The nut 40 is then slipped over the end of the conduit 11 and the thimble 25 threadedly attached thereto until the bead 38 abuts the end of the conduit core, as indicated in Fig. 3. The end of the conduit 11 with the thimble 25 attached may then be thrust into the body counterbore 29 and the nut 40 brought into threaded engagement with the body 18. Tightening of the nut 40 will exert a progressive radial inward squeeze on the thimble skirt 41, the tapering nut shoulder 45 camming over the outer periphery of the skirt 41 in a combined axial and circumferential movement which deforms the skirt radially inwardly with a sort of spinning action. Since the radial deformation of the conduit core will be negligible, it will be perceived that the deforming skirt 41 will exert a corresponding annular squeeze on the conduit sheath 16 so as to effect a highly satisfactory seal with the same but without destructively biting the sheath 16. Deformation of the skirt 41 in response to tightening of the nut 40 is also accompanied by a simultaneous thrusting action on the thimble 25, eventually wedging the inner end of the ferrule member 28 snugly into the tapered seat 30 and bringing the rolled end 39 of the inner ferrule 26 hard against the radial shoulder 31 of the body. When the parts have reached this position, as indicated in Fig. 4, and with the skirt 41 approximately even with the outer end of the nut 40, the installation of the fitting 10 is complete. In addition to the fluidtight seal thus created, the rubbing metal-to-metal contact between nut 40, outer ferrule 28, and body 18, on the one hand, and between inner ferrule 26 and the conduit core, on the other hand, produces an exceptionally high degree of electrical ground continuity which is most valuable when the fitting 10 is used in an electrical conduit system.

By reason of the construction just described, a conduit having one end anchored or fixed against rotation may readily be connected to a stationary fixture or to another appropriate fitting. Moreover, such connection may be effected easily and quickly by simply sawing off the conduit to length, attaching the thimble to its free end, and tightening a sealing nut. By reason of its simplicity, a fitting of this nature can be installed with equal facility in the factory or in the field.

Although the invention has been exemplified herein as embodied in an adapter type fitting which attaches to a stationary fixture, it should be borne in mind that the invention may also be embodied in a wide variety of other fittings such as couplings and connectors. Fittings embodying the present invention may also be utilized conveniently with sheathed conduit differing substantially in construction from the spiral wound flexible conduit disclosed herein for purposes of illustration.

I claim as my invention:

1. A fitting adapted for attachment to the free end of a conduit having a yieldable outer sheath thereon and comprising, in combination, a sleevelike body having a main bore and having a counterbore at one end thereof, a tapered seat in said body situated between the bore and the counterbore, said seat tapering inwardly from the counterbore toward the main bore, a transverse shoulder situated between said tapered seat and the main bore, external threads on said body disposed in surrounding relation with the counterbore and said inwardly tapered seat, an inner ferrule adapted for insertion into the conduit along the inner peripheral wall thereof and having means for positively attaching said inner ferrule to the same, an outer ferrule disposed in radially spaced surrounding relation with said inner ferrule, one end of said outer ferrule being fixed to said inner ferrule, the opposite end of said outer ferrule terminating in a radially deformable sealing skirt, said ferrules being constructed and arranged to fit initially into said body with said outer ferrule extending through said counterbore and into contact with said tapered seat, an annular sealing nut having threads engaging the said external threads on said body, said nut having a tapered internal shoulder decreasing in diameter toward the end of said nut remote from said body, said shoulder being of suitable diameter to receive said sealing skirt and squeeze the same radially inward against the conduit sheath as an incident to tightening of said nut, all of the foregoing parts being constructed and arranged so that tightening of said nut on said body will produce an axial thrust on said ferrules, forcing said outer ferrule into sealed relation with said tapered seat and said inner ferrule into abutting relation with said transverse shoulder.

2. A fitting adapted for attachment to the free end of a sheathed conduit having a spirally grooved core therein and comprising the combination of a tubular body having a main bore and a counterbore therein, a tapered seat situated between the main bore and the counterbore of said body, said seat tapering inwardly from the counterbore toward the main bore, a radial shoulder situated between said tapered seat and the main bore, external threads on said body disposed in surrounding relation with the counterbore and said inwardly tapered seat, an inner ferrule adapted for insertion into the conduit along the inner peripheral wall thereof, external threads on said inner ferrule for engaging the spirally grooved conduit core, an outer ferrule of substantially uniform thickness disposed in radially spaced surrounding relation with said inner ferrule, one end of said outer ferrule being fixed to said inner ferrule, the opposite end of said outer ferrule terminating in a radially deformable sealing skirt flaring outwardly toward its free end, a sealing nut having threads adapted for engagement with said external threads on said body, said nut having a tapered internal shoulder decreasing in diameter toward the end thereof remote from said body, said shoulder being adapted to squeeze said sealing skirt radially inward against the conduit sheath as an incident to tightening of said nut, said tapered internal shoulder also being adapted to force said outer ferrule into sealed engagement with said tapered seat and said inner ferrule into sealed engagement with said radial shoulder as an incident to tightening of said nut.

3. In a conduit fitting of the character set forth, a thimble member comprising, in combination, an inner ferrule, external threads on the outer periphery of said inner ferrule starting at one end and terminating at an intermediate point thereon, an annular bead on the outer periphery of said inner ferrule and situated between said external threads and the opposite end thereof, an outer ferrule of substantially uniform thickness, a collar and radial offset at one end of said outer ferrule telescoped over said inner ferrule and seated against said annular bead, a rolled bell mouthed end portion on said inner ferrule securing said collar and said radial offset against said annular bead, and an outwardly flared radially deformable sealing skirt integral with said outer ferrule and terminating at the end thereof remote from said collar and offset, said outwardly flared skirt having a maximum diameter at said remote end.

4. A fitting adapted for attachment to the free end of sheathed conduit having a spirally grooved core therein and comprising the combination of a tubular body having a main bore and a counterbore therein, a tapered seat on said body positioned between said main bore and said counterbore and forming a portion of the wall of said counterbore and being inclined in an inwardly direction toward the main bore, a radial shoulder situated at the bottom of said counterbore adjacent to and concentric with said main bore, external threads on said body disposed in concentric relation with the counterbore and said inwardly tapered seat and surrounding at least a portion of the length of said counterbore, an inner ferrule adapted for insertion into the conduit along the inner peripheral wall thereof, external threads on said inner ferrule for engaging the spirally grooved conduit core, an outer ferrule of substantially uniform thickness disposed in radially spaced surrounding relation with said inner ferrule, said inner and outer ferrules being rigidly joined to each other at one end to form a unitary thimble, the opposite end of said outer ferrule terminating in a radially deformable sealing skirt flaring outwardly toward its free end, a sealing nut having threads at one end thereof adapted for engagement with said external threads on said body and having at its other end a radially inwardly disposed flange, an annular tapered wedge concentric with said counterbore and associated with said nut for axial movement therewith toward and into engagement with the outwardly flaring skirt of said outer ferrule upon tightening of said nut on said body, said annular wedge being of increasing thickness toward the end thereof remote from said body for applying radially inward annular squeeze on the conduit sheath as an incident to tightening of said nut, said annular wedge also being adapted to force said thimble toward the bottom of said counterbore and to force said outer ferrule into positive engagement with said tapered seat to form an electrical conducting path from said thimble to said body.

References Cited in the file of this patent

UNITED STATES PATENTS

| | | |
|---|---|---|
| 172,470 | Morse | Jan. 18, 1876 |
| 511,138 | Hallas | Dec. 19, 1893 |
| 1,296,103 | Muehlberg | Mar. 4, 1919 |
| 1,486,421 | Dyer | Mar. 11, 1924 |
| 1,933,769 | Steele | Nov. 7, 1933 |
| 2,321,260 | Stecher | June 8, 1943 |
| 2,457,633 | Borg | Dec. 28, 1948 |
| 2,561,827 | Soos | July 24, 1951 |

FOREIGN PATENTS

| | | |
|---|---|---|
| 30,966 | France | July 20, 1926 |
| 432,642 | Great Britain | July 31, 1935 |